Sept. 8, 1931.    F. A. KADANE    1,821,972

POULTRY DRESSING CABINET

Filed Oct. 11, 1930

Inventor

Fred A. Kadane,

By

Attorney

Patented Sept. 8, 1931

1,821,972

UNITED STATES PATENT OFFICE

FRED A. KADANE, OF DALLAS, TEXAS

POULTRY DRESSING CABINET

Application filed October 11, 1930. Serial No. 488,130.

This invention relates to poultry dressing cabinets, and the primary object thereof is to provide a cabinet which has means for housing the poultry so that same is readily displayed to the customer, and which further has means for enabling the operations of killing and dressing a fowl selected by the customer to be performed, so that the fowl can be delivered to the customer while the latter waits.

The invention further aims to provide a cabinet of this type which is readily portable and which occupies a minimum of space and enables the various operations to be not only easily and quickly but successively performed so that the fowl can be delivered to the customer with the least possible waiting time, and with a minimum of the dealer's time.

Still further the invention aims to provide a cabinet of this type which is compact and which enables the various operations to be successively performed by the attendant with a minimum of movement, and which also enables the customer, after the fowl has been killed to observe the dressing operations, if desired.

Another object of the invention is to provide a cabinet of this type which enables the dressing to be performed in a sanitary manner.

Figure 1:
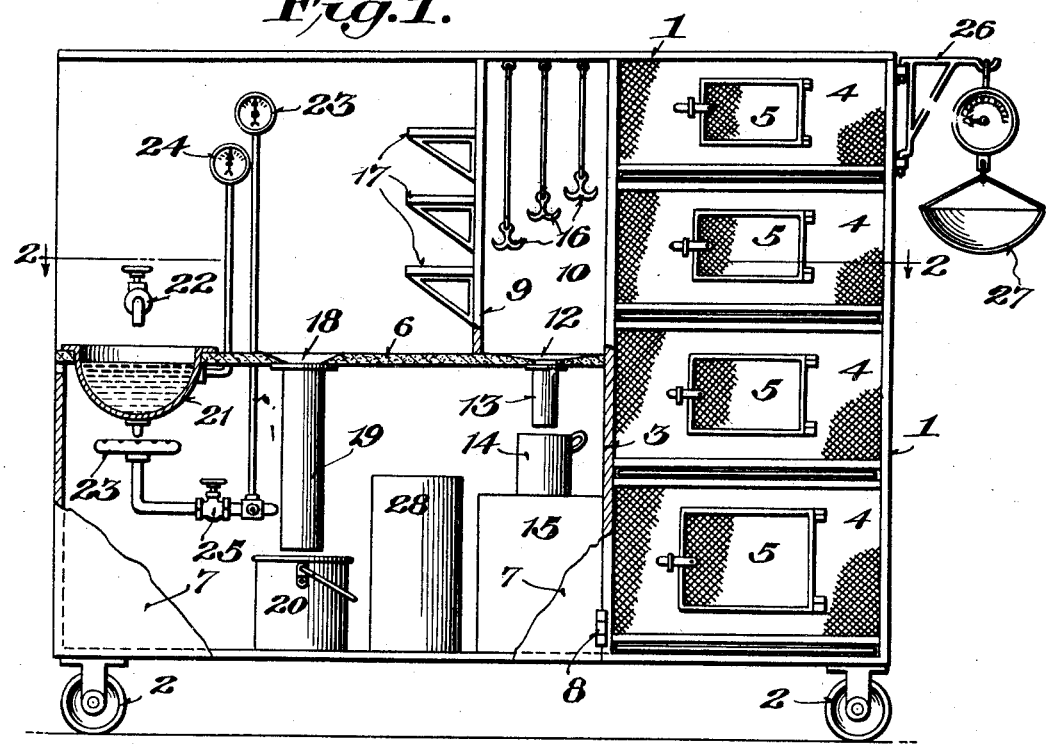
Fig. 1 is a side elevation partly in section, of the invention.
Figure 2:
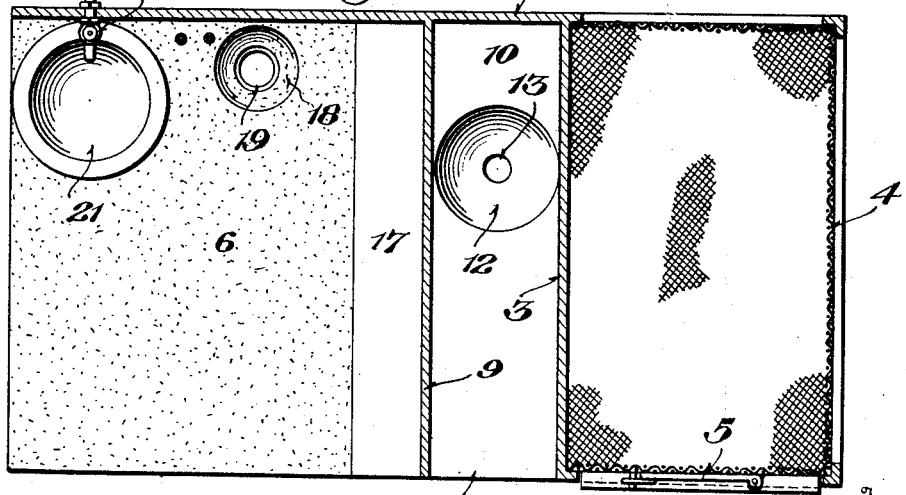
Fig. 2 is a section on line 2—2 of Fig. 1.

In proceeding in accordance with the present invention a housing 1 is employed which is mounted upon traction rollers or wheels 2. A vertical partition 3 extends transversely across the housing in spaced relation to an end of the latter and receives in such space a series of chicken coops 4 which are provided with doors 5. The coops have wire ends and front sides as depicted in the drawings, so that the customer may readily inspect the poultry and select a fowl. A work table 6 extends from the partition 3 to the opposite end of the housing, the space below the work table being closed by a door 7 shown in fragment in Fig. 1; the door being hinged at 8.

A partition 9 extends upwardly from the work table in spaced relation to the partition 3 to form a killing stall or compartment 10 which latter is open at its front at 11, so that the attendant can kill the fowl in the compartment out of the vision of the customer. The bottom of the compartment 10 is provided with a dished portion 12 so that the blood can drain thereinto and through a pipe 13 into a can 14. The can 14 seats on the top of a chicken feed container 15 and is readily removable for the purpose of emptying, as required. Hooks 16 are suspended within the compartment 10 for the purpose of enabling the fowl to be hung thereon if desired, and shelves 17 are carried by the partition 9 for receiving and displaying previously killed fowl. The work table 6 further has a dished portion 18 which communicates with a conduit 19 which latter discharges into a bucket 20, so that the feathers and other parts may be dropped into the bucket. A water receiving basin 21 is carried by the work table 6 and may receive water from a spigot 22 connected to any suitable source of water supply not shown. A gas burner 23 is disposed below the basin 21 to heat same and is connected to a gas pressure gauge 23. A temperature gauge 24 of any suitable type communicates with the water in the basin 21 so that the temperature of the water may be regulated by manipulation of a gas supply valve 25. A hook 26 supporting a scale 27 is connected to the rear end of the cabinet as shown in Fig. 1.

In operation, the customer inspects the poultry and following selection of one or more thereof, same are weighed on the scale 27. The dealer then kills the fowl in the compartment 10, and drains the blood through the pipe 13 into the can 14. The fowl is then moved from the compartment 10 and placed into the heated water in the basin 21. The feathers are then removed and dropped into the conduit 19, together with any other parts of the fowl which the customer may desire to have removed, such as the head or legs. The fowl is then placed in a cooling tank 28 arranged below the work table, and following cooling is delivered to the customer.

From the foregoing it will be seen that the present invention enables the poultry to be easily and quickly killed and dressed with a minimum of waiting time on the part of the customer, and of the dealer, and further provides a self-contained apparatus, which constitutes a unit for not only housing and displaying the poultry, but for also enabling the dressing operations to be easily and quickly performed in a minimum of time.

It will also be noted that the killing compartment and the space above the work table both open through the front of the housing, thereby rendering these parts freely accessible to the dealer from a standing position on the floor.

What is claimed is:

1. A portable poultry dressing cabinet composed of a housing, a work table, a killing compartment associated with the work table, a dressing compartment adjacent the killing compartment, independent means in the killing and dressing compartments for draining refuse from the table to points below the latter, said killing compartment being relatively narrow in width and of substantially greater height than width and being closed on all sides excepting one and said dressing compartment having an open side adjacent the open side of the killing compartment, a live poultry display compartment carried by the housing, and traction wheels carried by the housing for mounting same for movement.

2. A poultry dressing cabinet composed of a housing, a work table, a killing compartment associated with the work table, a dressing compartment adjacent the killing compartment, independent means in the killing and dressing compartments for draining refuse from the table to points below the latter, said killing compartment being relatively narrow in width and of substantially greater height than width and being closed on all sides excepting one and said dressing compartment having an open side adjacent the open side of the killing compartment.

3. A poultry dressing cabinet composed of a housing having a killing compartment and a dressing compartment arranged adjacent thereto, independent means for draining refuse from each compartment to points exteriorly thereof, said compartments having adjacent open sides, so that the dealer can instantaneously transfer the poultry from the killing to the dressing compartment, and said killing compartment being closed on all of its remaining sides and having its open side of relatively narrow width and of substantially greater height than width.

4. In a poultry dressing cabinet, a housing having a work table therein, a live poultry display compartment having a wall adjacent one end of the table, a vertical partition spaced from said wall and extending upwardly from the work table so that one side thereof forms a killing compartment in conjunction with the wall and the opposite side thereof forms one wall of a dressing compartment, said killing compartment being of relatively narrow width and of substantially greater height than width and being open at its front, means to support killed fowl in the killing compartment, means carried by said partition and disposed in the dressing compartment to support dressed fowl, a scalding pan carried by the work table and disposed in the dressing compartment, and independent means in the killing and dressing compartments to drain refuse from the work table to points below the latter.

In testimony whereof I affix my signature.

FRED A. KADANE.